(12) United States Patent
Simpson et al.

(10) Patent No.: US 6,234,127 B1
(45) Date of Patent: *May 22, 2001

(54) TORSIONALLY COMPLIANT AND DAMPED SPROCKET SYSTEM WITH POSITION STOPS

(75) Inventors: Roger T. Simpson, Ithaca; Philip J. Mott, Dryden; Marty Gardner, Ithaca, all of NY (US)

(73) Assignee: BorgWarner Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/392,657

(22) Filed: Sep. 9, 1999

Related U.S. Application Data

(60) Provisional application No. 60/100,879, filed on Sep. 17, 1998.

(51) Int. Cl.[7] .................................................... F01L 1/02
(52) U.S. Cl. ................................... 123/90.31; 123/192.2
(58) Field of Search .............................. 123/192.1, 192.2, 123/90.31

(56) References Cited

U.S. PATENT DOCUMENTS

| | | |
|---|---|---|
| 1,254,542 | 1/1918 | Schwinn . |
| 1,518,360 | 12/1924 | Royce . |
| 4,125,036 * | 11/1978 | Nakamura et al. ................... 74/604 |
| 4,139,995 | 2/1979 | Lamarche . |
| 4,150,587 * | 4/1979 | Bremer, Jr. ............................. 74/574 |
| 4,254,985 | 3/1981 | Kirschner . |
| 4,317,388 | 3/1982 | Wojcikowski . |
| 4,556,026 * | 12/1985 | Masuda et al. ................... 123/198 F |
| 4,644,916 * | 2/1987 | Kitagawa ......................... 123/192 B |
| 4,696,267 * | 9/1987 | Kohno et al. .................... 123/192 B |
| 4,776,307 * | 10/1988 | Ruf et al. .......................... 123/90.31 |
| 5,174,257 * | 12/1992 | Ozawa .............................. 123/192.2 |
| 5,231,893 * | 8/1993 | Sisco et al. ............................ 74/574 |
| 5,308,289 | 5/1994 | Funahashi . |
| 5,427,580 | 6/1995 | Ledvina et al. . |
| 5,560,267 | 10/1996 | Todd et al. . |
| 5,579,665 | 12/1996 | Mott et al. . |
| 5,609,127 * | 3/1997 | Noplis ............................... 123/90.17 |
| 5,619,887 | 4/1997 | Simpson . |
| 5,655,416 | 8/1997 | Mott et al. . |
| 5,935,007 * | 8/1999 | Yang ....................................... 464/24 |
| 6,109,227 * | 8/2000 | Mott .................................. 123/90.31 |

* cited by examiner

Primary Examiner—Willis R. Wolfe
Assistant Examiner—Katrina B. Harris
(74) Attorney, Agent, or Firm—Sidley & Austin; Greg Dziegielewski

(57) ABSTRACT

The present invention relates to a torsionally compliant sprocket system which absorbs crankshaft torsional vibrations and minimizes their transfer to other components in the engine system. In particular, the present system interposes resilient spring members between a crankshaft sprocket and an adjacent balance shaft drive sprocket which are interconnected. A damping mechanism provides damping of the system to reduce resonant oscillations.

15 Claims, 6 Drawing Sheets

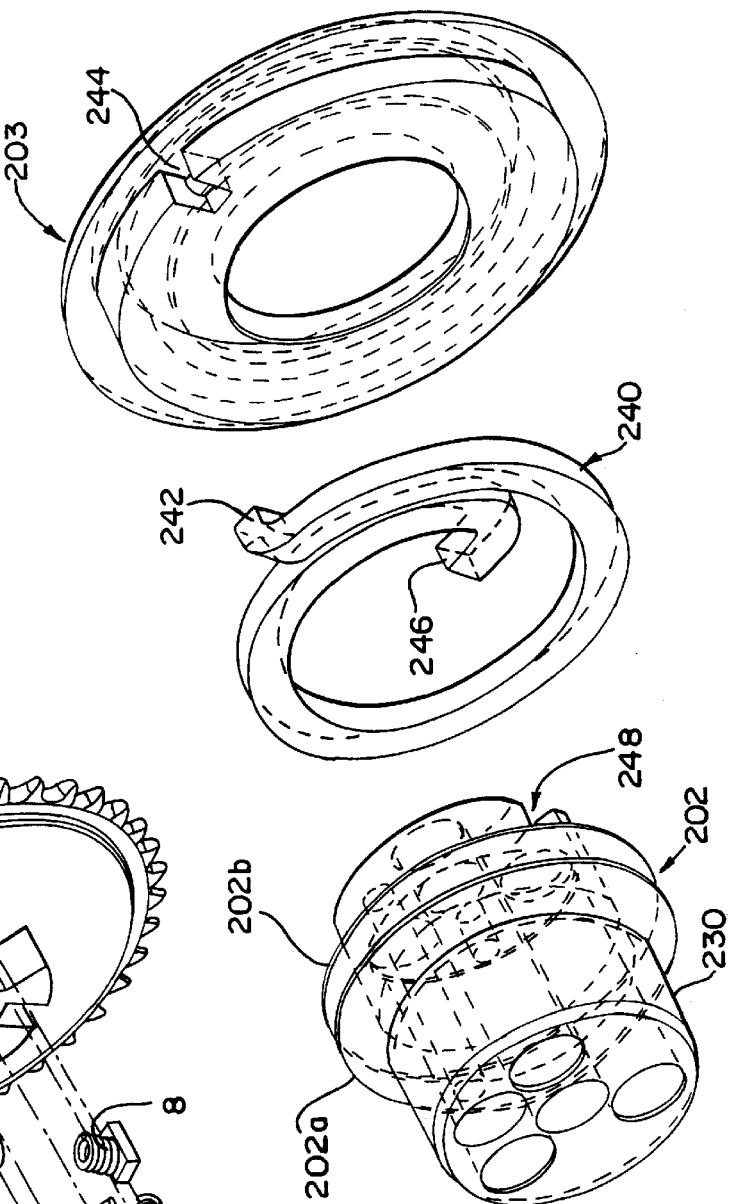
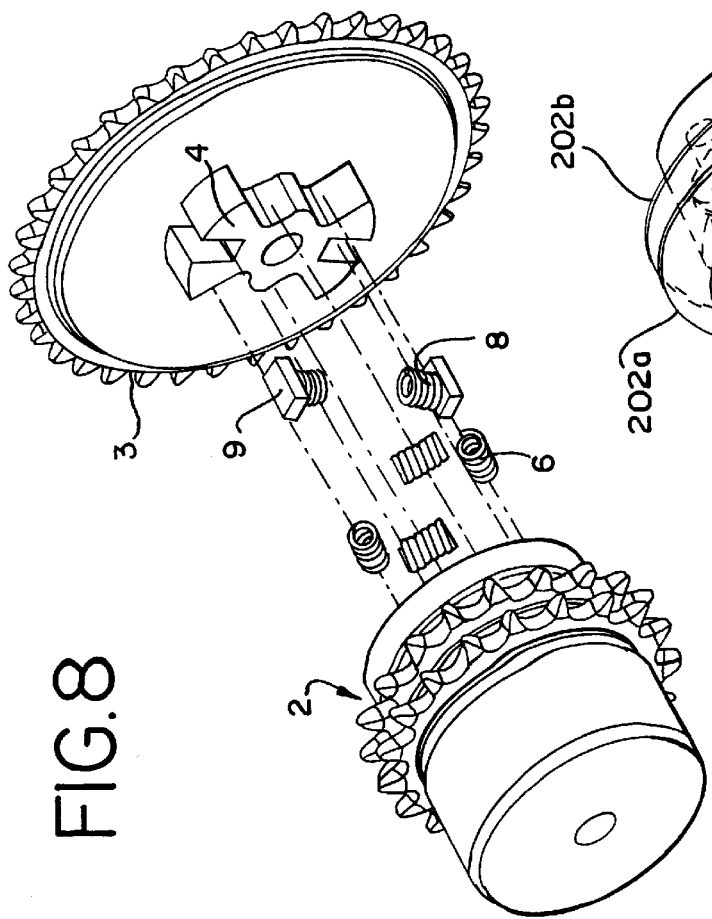

TORSIONALLY COMPLIANT AND DAMPED SPROCKET SYSTEM WITH POSITION STOPS

This application claims the benefit of provisional application U.S. Ser. No. 60/100,879, filed Sep. 17, 1998. Reference is made to co-pending U.S. Application Ser. No. 09/154,814, filed Sep. 17, 1998, entitled "Torsionally Compliant Sprocket System for Balance Shaft Drive", the subject matter of which relates to the present invention and is incorporated herein by reference.

FIELD OF INVENTION

This invention relates to the damping of vibrations in engine balance shaft drives. This invention has particular application to engine timing and balance drive systems driven by two sprockets located adjacent to each other on a rotating crankshaft. More particularly, this invention relates to a torsionally compliant and damped sprocket system for absorbing torsional loads and damping vibrations originating from the driving shaft.

BACKGROUND OF THE INVENTION

Engine timing systems typically include an endless chain wrapped around a driving sprocket on an engine crankshaft and a driven sprocket on an engine camshaft. The rotation of the crankshaft causes the rotation of the camshaft through the endless chain system. A second sprocket mounted upon the crankshaft may be used to drive a balance shaft system using a separate endless chain.

More complicated engine timing systems connect the crankshaft with two or more shafts by a pair of chains. The crankshaft includes two sprockets. Each chain is connected to one or more driven sprockets, including sprockets on each of the two overhead camshafts. Typically, the chain systems in more complicated engine timing systems will include tensioners on the slack side of each chain to maintain chain tension and snubbers on the tight side of each chain to control chain movement during operation.

Some engine timing systems have two (or dual) overhead camshafts for each bank of cylinders. The dual camshafts on a single bank can both be rotated by connection to the same chain. Alternatively, the second camshaft can be rotated by an additional camshaft-to-camshaft chain drive. The cam-to-cam drive chain can also include single or dual tensioners for chain control.

In some engine timing systems, such as those having a non-conventional firing order for the cylinders, balance shafts are employed to counterbalance engine vibration. The balance shafts are driven by a chain connection from the crankshaft. Optionally, the balance shaft drive system may be utilized to operate an auxiliary drive such as a compressor or the like. Since the balance shafts are driven by the crankshaft, torsional vibrations and oscillations along the crankshaft may be transferred to the balance shafts and likewise throughout the timing system.

The rotating crankshaft may undergo resonance at certain frequencies. Since the balance shafts are coupled to the crankshaft by the balance shaft chain, the balance shafts are directly exposed to these extreme resonant torsional vibrations. Vibrations from the resonance of the crankshaft are often transferred throughout the system, including the balance shafts and associated engine elements and can significantly increase the load on the systems and components, increase the noise from the engine and increase wear and accelerate fatigue of the chains.

Conventional approaches to this problem have focused on reducing rotational perturbation of the crankshaft, by means of internal devices such as counter-rotating balance shafts, Lanchaster dampers and harmonic balancers. External devices such as fluid engine mounts and engine mounts having adjustable damping characteristics have been used.

By contrast, the present invention focuses on absorbing the torsional vibrations of a crankshaft using a torsionally compliant and damped sprocket system. The torsionally compliant and damped sprocket system minimizes the transfer of such vibrations and torque spikes to other parts of the engine system. The torsionally compliant sprocket system interposes resilient members between the drive sprockets mounted on the crankshaft to absorb vibrations and reduce transfer of the crankshaft vibrations. The present invention, in addition, provides a damping mechanism to add sufficient damping to reduce or eliminate vibrations associated with resonant frequencies in the system.

Some prior art timing systems use various damping devices to address the problem of vibrations. One example of such prior art system uses a rubber damper piece which is placed against a sprocket and bolted to the shaft to absorb vibrations. However, the rubber damper piece may fracture from the extreme resonance vibrations. Other timing systems employ a weight that is positioned on the shaft and held against the sprocket by a Belleville washer. Frictional material is also placed at the area of contact between the sprocket and the weight. These systems, while effective at damping have drawbacks in terms of production, assembly and durability. None apply damping to a compliant sprocket.

An example of the above-described prior damping techniques is found in Wojcikowski, U.S. Pat. No. 4,317,388, which issued on Mar. 2, 1982. That patent discloses a gear with split damping rings of diameter slightly smaller than the gear bolted to each side of the gear with a tapered bolt and nut assembly. Tightening of the bolt cams the damping ring outward, producing pressure circumferentially against the rim of the gear and causing tensile stress on the gear. Additionally, tightening of the bolts presses the elastomeric washers associated with the bolt and nut assembly firmly against the web of the gear which damps the stress wave passing from the rim through the web and into the shaft. In contrast to this prior art structure, the present invention utilizes a novel arrangement of sprockets to produce a torsionally compliant sprocket assembly to reduce the transfer of vibrations of the crankshaft to other parts of the engine timing and balance shaft drive system.

Another example of the above-described prior art is Funashashi, U.S. Pat. No. 5,308,289, which issued on May 3, 1994. The damper pulley disclosed therein consists of a pulley joined to a damper mass member with a resilient rubber member. The pulley and the damper-mass member each have at least two projections, and the projections of the pulley contact the sides of the projections of the damper mass member. A second resilient rubber member is placed between the contacting projections. Bending vibrations from the crankshaft cause the pulley to vibrate in the radial direction and the first resilient rubber member deforms, causing the dynamic damper to resonate with the pulley and restrain the bending vibrations. Torsional vibrations cause the pulley to vibrate in the circumferential direction. The second resilient rubber member undergoes compression deformation, decreasing the spring force and raising the resonance frequency against the torsional vibrations. Compliance for a sprocket used in a timing drive system or balance shaft drive system is not contemplated. The present invention avoids the use of rubber which has wear problems in use.

Another example of a prior damping technique is found in Kirschner, U.S. Pat. No. 4,254,985, which issued on Mar. 10, 1981. That patent discloses a damping ring for rotating wheels that includes a viscoelastic damping material disposed within an annular groove in the surface of the wheel. A metal ring is positioned in the groove at the top of the damping material. In operation, the damping material undergoes shear deformation. The technique is applied to train car wheels to reduce brake noise.

Still yet another example of prior art damping techniques is found in U.S. Pat. No. 4,139,995 which discloses a high deflection amplitude torsional vibration damper for use in a torsional coupling between a driving member and a driven member. The damper includes a hub receiving a driven shaft and having oppositely disposed arms. The damper has a pair of equalizers with oppositely extending arms journal led on the hub. A pair of cover plates encloses the assembly and has integral driving means formed therein. A plurality of compression springs are found within the plates, positioned between the hub and equalizer arms. The technique is disclosed being used in a drive train clutch but not a compliant sprocket.

SUMMARY OF THE INVENTION

In an engine timing and balance system, an endless chain connects a driving sprocket on the crankshaft to a driven sprocket on a camshaft. The rotation of the driving sprocket advances the chain, which turns the driven sprocket and the camshaft. Torsional vibrations occur during system operations and may be exceptionally severe at resonance conditions. To reduce these vibrations and to reduce the transfer of these vibrations to other portions of the engine, the present invention provides a torsionally compliant arrangement of the crankshaft sprocket in conjunction with the balance shaft sprocket.

In particular, in a first embodiment, the torsionally compliant sprocket system comprises a balance shaft drive sprocket having an axially extending member which abuts and mates with a cut out recess formed in the crankshaft drive sprocket. The two sprockets are resiliently connected by the use of a plurality of springs which absorb the crankshaft vibrations and prevent the transfer of these vibrations to the balance shaft.

Stop blocks are provided between the axially extending member of the balance shaft drive sprocket and the recess of the crankshaft drive sprocket to prevent damage to the resilient members. The stop, blocks may be extensions formed in the walls of the recess which engage the extending member when the balance shaft drive sprocket rotates more than a predetermined amount.

When the system is excited at its natural frequency, large amplitudes of torsional oscillation may be generated, which tends to negate the effectiveness of the compliant sprocket. Accordingly, it has been found that the compliant sprocket system benefits by the addition of a damping mechanism.

Damping is provided to the torsionally compliant sprocket system by a pair of springs which bias a pair of metal blocks outwardly from a pair of slots or housings formed in the axially extending member of the balance shaft drive sprocket. The metal blocks provide friction damping to the system by bearing against a surface of friction material provided on the inside of the recessed portion of the crankshaft sprocket. The damping mechanism serves to add sufficient damping to eliminate the issues associated with natural frequency oscillations, while still maintaining the required compliance in the system. Computer modeling, bench testing and engine testing have all shown that damping is an effective and required means of eliminating the large oscillations of the compliant sprocket due to system resonance.

In a second embodiment the torsionally compliant sprocket includes a first driving sprocket, a spiral planar torsion spring, and a second sprocket positioned on the crankshaft, used in conjunction with the engine balancer drive system. The planar torsion spring is held abuttingly in contact with the driving sprocket on its one side and the second sprocket on its other side. However, the planar torsion spring moves independently of the two sprockets. Movement of the planar torsion spring acts to absorb the crankshaft torsional vibrations and reduce their transfer to the tension on the balance shaft chain and balance shaft drive. The planar torsional spring serves to isolate the driving sprocket from the balance shaft without compromising the integrity of the drive. While in its preferred embodiment, the spring is planar, the invention is not necessarily limited to such a construction.

Compliance or damping is provided the torsionally compliant sprocket with the planar torsional spring. The damping mechanism serves to add sufficient damping to eliminate the issues associated with a natural resonant frequency, while still maintaining the required compliance in the system. The damping mechanism is a belleville spring placed and acting between the compliant sprocket and the crankshaft. While many methods of providing damping to the sprocket would be acceptable, (such as centrifugally inactivated shoes, rubber, electromagnetic, or hydrodynamic), friction damping with force supplied by the belleville spring would be most cost and space efficient.

For a more complete understanding of the invention, one should refer to the embodiments illustrated in greater detail in the drawings and described below by way of examples of the invention.

BRIEF DESCRIPTION OF THE DRAWINGS

FIG. 8 is an exploded perspective view of the torsionally compliant sprocket of the present invention.

FIG. 9 is an exploded view of the torsionally compliant sprocket system of a second embodiment of the present invention.

DETAILED DESCRIPTION OF THE PREFERRED EMBODIMENTS

Figure 1:
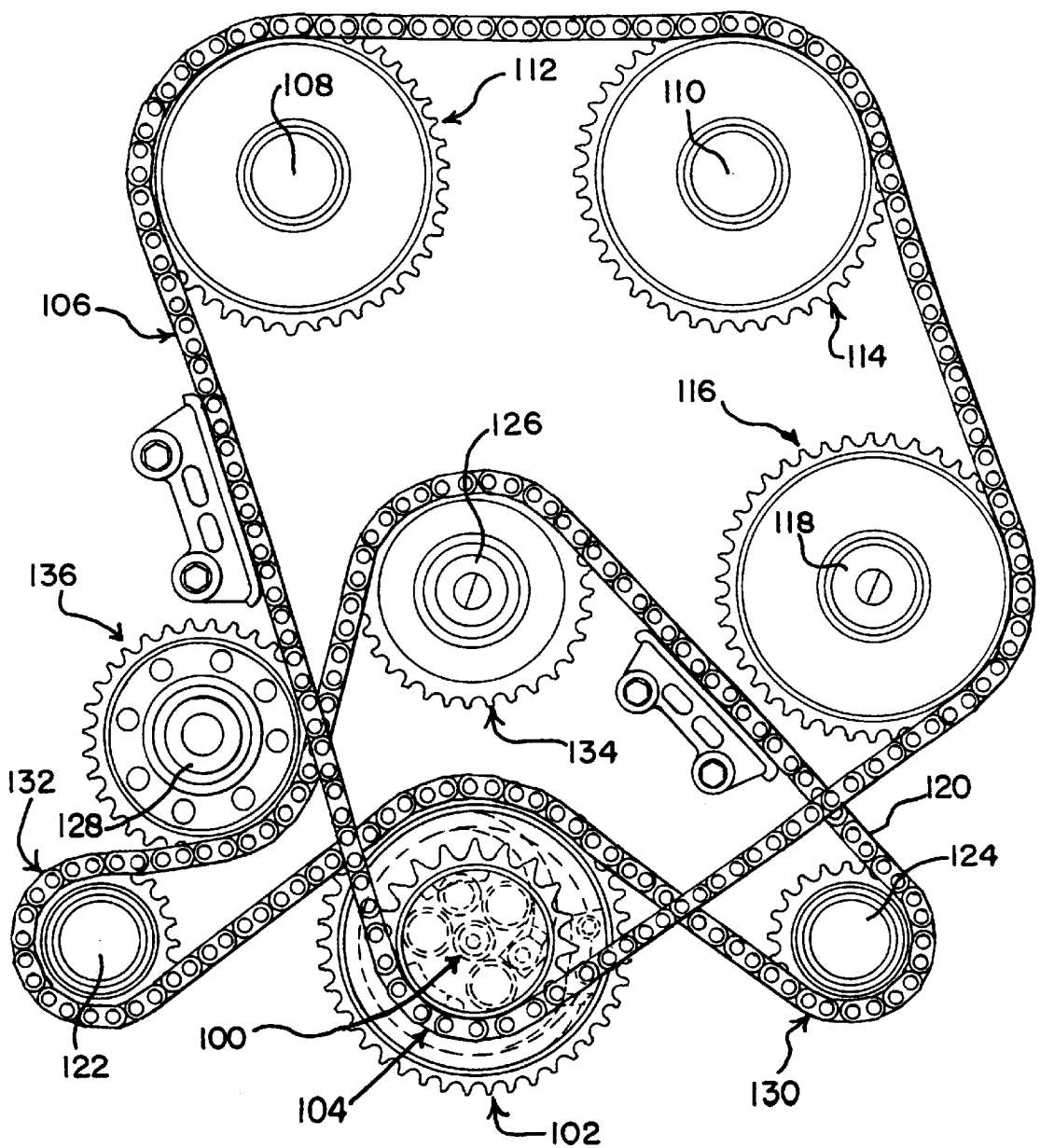
FIG. 1 is schematic view of an engine system which incorporates the torsionally compliant sprocket system of the present invention.

The torsionally compliant sprocket system of the present invention can be utilized in a multiple axis timing chain system, which is schematically illustrated in FIG. 1. The sprockets can be either single units or sprocket pairs, with the pairs having aligned teeth or having their teeth phased, or offset, by a portion of one tooth. Phased sprockets and chain assemblies are described in U.S. Pat. No. 5,427,580, which is incorporated herein by reference in its entirety.

Crankshaft 100 provides power output through balance shaft drive sprocket 102, and crankshaft drive sprocket 104. Crankshaft drive sprocket 104, carries load or transmits power to chain 106. The chain 106 provides the primary drive of the two overhead camshafts 108 and 110. Camshaft 108 includes a camshaft sprocket 112 and camshaft 110 also includes a camshaft sprocket 114. The chain 106 also drives idler shaft 118 by wrapping abound and drivingly engaging idler sprocket 116.

The second sprocket 102 mounted upon the crankshaft 100 is a balance shaft drive sprocket that provides power transmission through chain 120 to a pair of balance shafts 122, 124, an idler shaft 126 and to an accessory drive 128, such as a compressor or an oil pump drive. Chain 120 therefore transmits power from the balance shaft drive sprocket 102 to a first balance shaft driven sprocket 130 and to a second balance shaft driven sprocket 132. The chain also drives idler sprocket 134 on idler shaft 126 and accessory drive sprocket 136 on accessory drive 128. The balance shaft chain drive system can include a pair of chains in place of single chain 120, and a pair of sprockets in place of single sprocket 102. In such a system, one chain of the pair of chains would preferably drive the idler sprocket while the other chain of the pair of chains would drive the accessory drive.

The chain assemblies of the multi-axis chain drive system shown in FIG. 1 utilize conventional snubbers and tensioning devices (not shown) to maintain tension and lateral control in various portions of the chain drive. Such devices are known to those skilled in the chain art.

FIGS. 2 through 8 illustrate a torsionally compliant sprocket system of a first embodiment of the present invention, in which crankshaft drive sprocket 2, which drives the camshafts corresponds to sprocket 104 illustrated in FIG. 1. Similarly, balance shaft drive sprocket 3, which drives the balance shafts, corresponds to sprocket 102 in FIG. 1.

Figure 2:
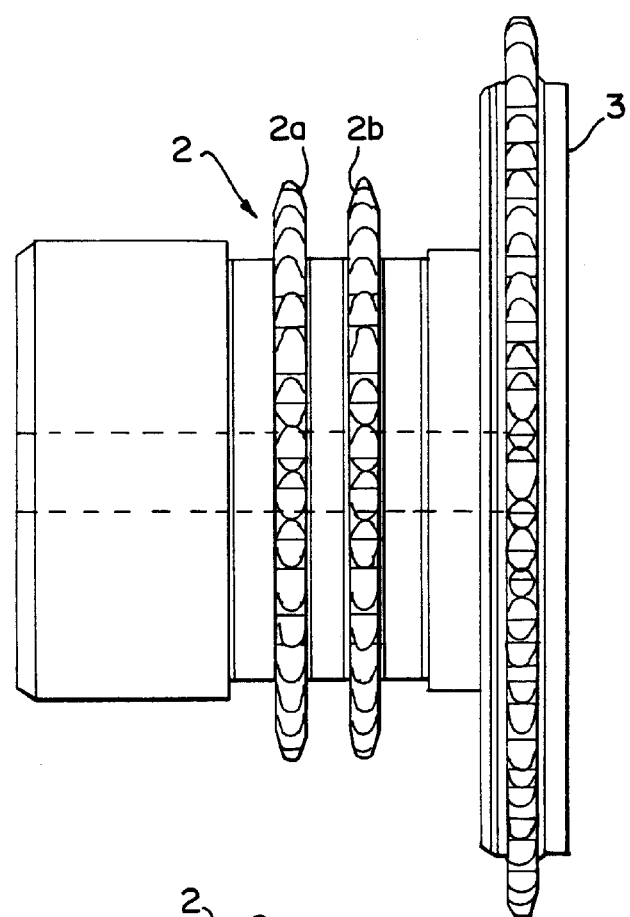
FIG. 2 is a side view of the torsionally compliant sprocket system of the instant invention showing the balance shaft drive sprocket and the crankshaft sprocket interconnected.

Referring to the drawings relating to the torsionally compliant sprocket system of the present invention, FIG. 2 illustrates a side view of the torsionally compliant sprocket system of the instant invention. In this figure, the balance shaft drive sprocket 3 is interconnected to the crankshaft drive sprockets 2a, 2b. The sprockets 2a, 2b are a pair of sprockets with the teeth aligned with each other. The teeth may also be out of phase to give noise reduction benefits. A pair of chains or a chain assembly is used in conjunction with the sprockets 2a, 2b. Due to the lower load requirements of the balance drive use of a single sprocket is sufficient. The assembly of sprockets is fixed to the end of a crankshaft (not shown).

Figure 3:
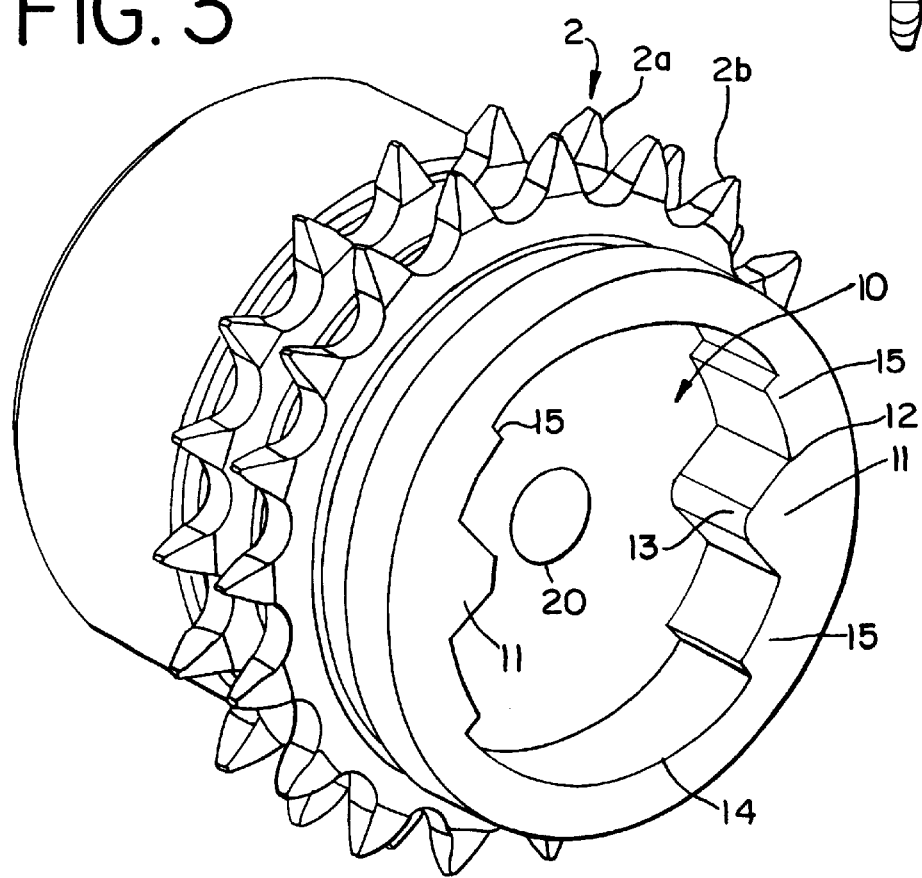
FIG. 3 is a perspective view of an embodiment of a crankshaft sprocket which can be utilized in the torsionally complaint sprocket system of the instant invention.

A crankshaft drive sprocket 2 as used in one embodiment of the torsionally compliant sprocket system of the instant invention is shown in FIG. 3. The crankshaft sprocket may be any conventional involute tooth sprocket or a split sprocket with two sets of teeth for engaging a double row chain or chain assembly. The crankshaft sprockets 2a, 2b which are made of steel have a recessed cut out portion 10 on the face of the sprocket which will be mounted adjacent to the balance shaft drive sprocket. At the axial center of the crankshaft sprocket is a central axial opening 20 so that the crankshaft sprocket may be mounted onto a crankshaft. The crankshaft sprocket is securely fastened to the crankshaft by any suitable fastening means, such as weldment, splines or keyways.

A chain wraps around the crankshaft drive sprocket to drivingly connect the crankshaft to the camshaft. The size of the sprocket and the dimensions are dependent upon the system configuration and the power requirements.

The crankshaft sprocket cut out recessed portion 10 is basically a circular cut out having two offset triangular projections 11 extending inwardly toward the central axis of the crankshaft. The base 12 of each of the triangular projections is located at the perimeter of a circle 14 which forms the outside boundary for the cut out portion, with the apex 13 of each of the triangular projections located toward the center of the cut out portion. The two triangular projections are offset from each other so that sets of springs may be interposed between a corresponding mating section on the balance shaft drive sprocket. The cut out portion is sized so that the extending member of the balance shaft matingly fits into the cut out portion of the crankshaft sprocket with spaces for the spring sets.

The cut out recessed portion 10 can be any desired shape provided, however, that the extending member of the balance shaft sprocket has complementary cutouts so that the extending member of the balance shaft sprocket fits into the recessed cut out portion having triangular projections of the crankshaft sprocket.

Position stops 15 are formed on both sides of the triangular portions along the inner surface of the receiving portion or circle 14. They are adapted to engage corresponding surfaces formed on the cut out portions of the extending member on the balance shaft sprocket when the balance shaft sprocket moves clockwise or counter clockwise with respect to the crank sprocket a predetermined amount. This prevents over rotation of the balance shaft sprocket and reduces the possibility of damage to the resilient members or springs.

Figure 4:
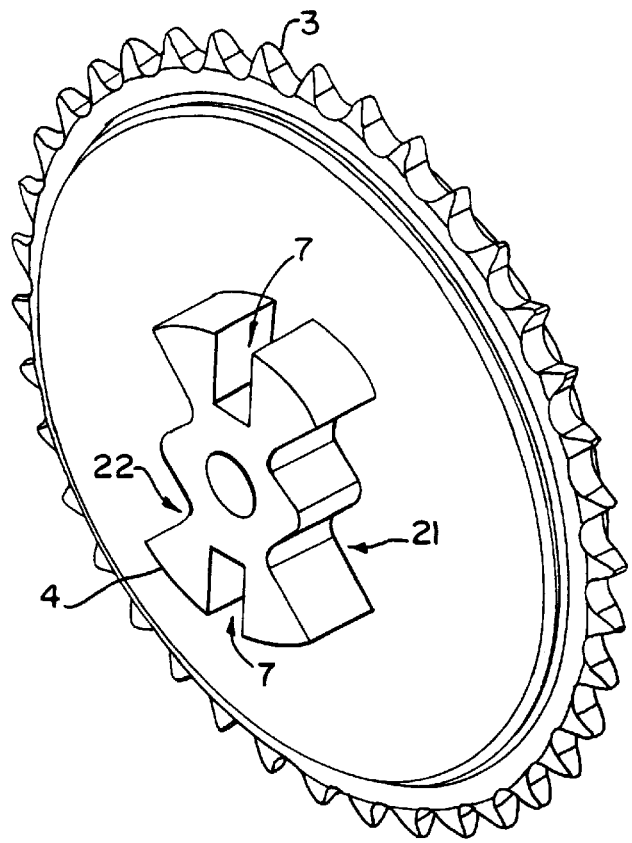
FIG. 4 is a perspective view of an embodiment of a balance shaft sprocket which can be used in conjunction with the crankshaft sprocket illustrated in FIG. 3.

As shown in FIG. 4, the balance shaft sprocket 3 is used in conjunction with the embodiment of the crankshaft sprocket described above. The balance shaft sprocket may be any conventional involute tooth sprocket or pair of split sprockets. The balance shaft sprocket which is made of steel has an extending member 4. The extending member 4 of the balance shaft sprocket is an axially extending member. The axially extending member 4 has two sets of cut outs 21, 22, diametrically opposed but offset from each other. The cut outs on the axially extending member of the balance shaft sprocket are configured so that the axially extending member of the balance shaft drive sprocket fits into the recessed cut out portion of the crankshaft drive sprocket.

In the present embodiment, to fit into the recessed cut out portion of the crankshaft sprocket with the triangular projections as illustrated in FIG. 3, each set of cut outs on the axially extending member is configured as two triangles, adjoining each other at the base with the apex of each of the triangles extending toward the center axis of the extending member of the balance shaft sprocket. Basically, when the balance shaft sprocket extending member is viewed in plan view, each set of cut outs is shaped essentially like a zigzag or "W".

The axially extending member 4 has a pair of damper spring housings 7 formed opposite each other and between the two sets of cut outs 21, 22. The damper spring housings are slots which open to the outer periphery of the axial member 4.

Figure 5:
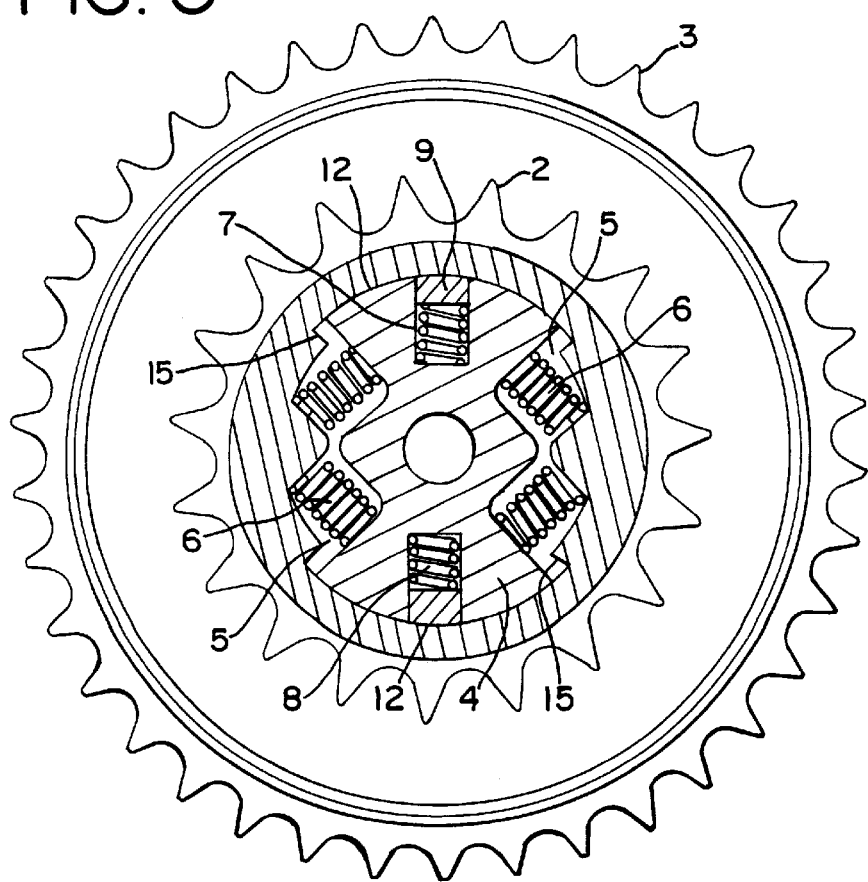
FIG. 5 is a schematic view showing the crankshaft sprocket and the balance shaft sprocket in an initial position.

When the crankshaft drive sprocket 2 and the balance shaft drive sprocket 3 are assembled, the extending member of the balance shaft sprocket fits into the recessed cut out portion of the crankshaft sprocket and the two are cooperate as best shown in FIG. 5. The cut outs on the axially extending member of the balance shaft sprocket in conjunction with the recessed cut out of the crankshaft sprocket provide a housing 5 for the resilient member 6 between the crankshaft sprocket and the balance shaft sprocket. Generally, the resilient member 6 comprises any type of resilient element. For example, springs can be used as the resilient member, provided that the springs are placed between the cut outs of the axially extending member 4 of the balance shaft sprocket 3 and the recessed cut out 10 of the crankshaft sprocket 2. Various elastomeric materials may also be used as the resilient member 6.

In a preferred embodiment, four springs 6 are compressed and preloaded into the housing 5 formed between the recessed cut out portion 10 of the crankshaft sprocket 2 and the extending member 4 of the balance shaft sprocket 3. The resilient member 6 also serves to center the balance shaft sprocket 3 around the crankshaft.

Damper springs 8 reside in damper spring slots or housings 7 and bias blocks 9 against circular surface 12. The circular surface 12 is made of material or coated with a material which acts to produce friction when blocks 9 pass over the surface 12 as extending member 4 rotates within recess 10. Friction between blocks 9 and surface 12 produces damping between the sprockets 2 and 3.

The torsionally compliant sprocket assembly also provides for a position stop 15. As one set of the springs 6 is allowed to compress during relative movement in one direction, the movement of the two sprockets relative to one another is stopped when the stops 15 contact a corresponding surface of the extending member 4. Relative movement in the opposite direction is also limited by the position stops facing the opposite direction and aided by compression of the other set of springs.

Figure 6:
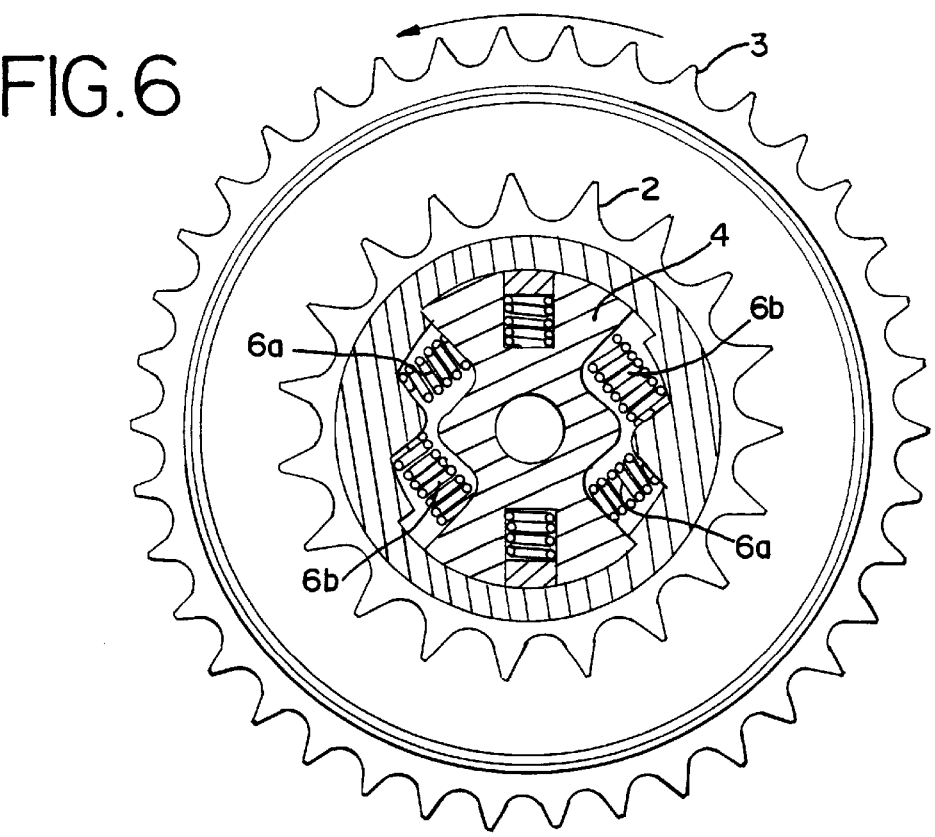
FIG. 6 is a schematic view showing the springs between the crankshaft sprocket and the balance shaft sprocket with the balance shaft sprocket moved counterclockwise relative to the crankshaft sprocket.
Figure 7:
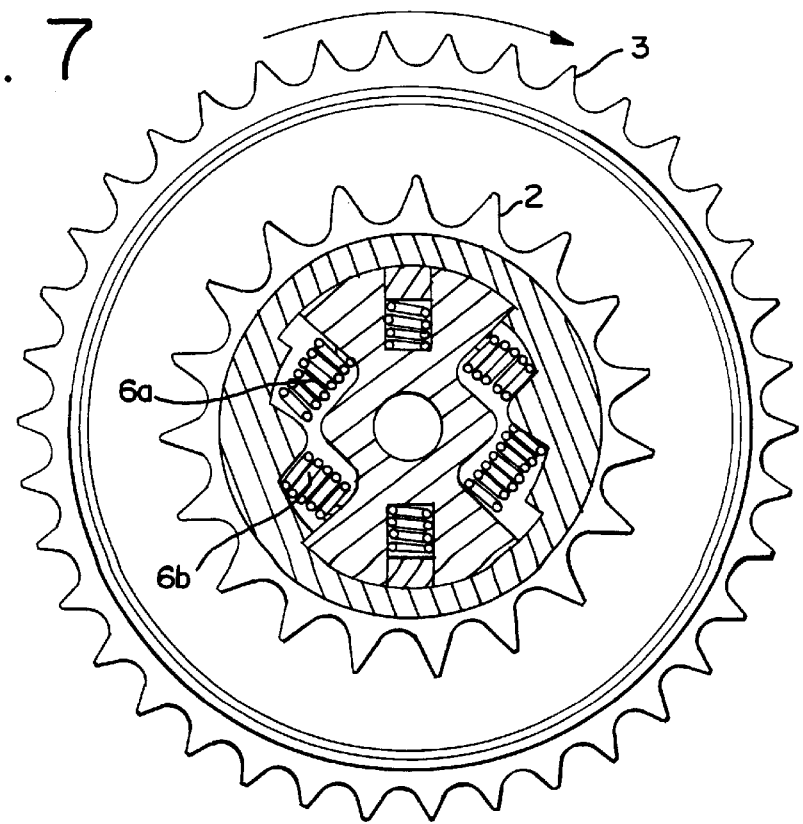
FIG. 7 is a schematic view showing the springs between the crankshaft sprocket and the balance shaft sprocket with the balance shaft sprocket moved clockwise relative to the crankshaft sprocket.

In operation, as the balance shaft sprocket rotates relative to the crankshaft sprocket, two of the springs compress in the spring assembly whereas the two opposite springs extend. The sprockets in their initial states with no relative movement between the sprockets is shown in the schematic drawing of FIG. 5. FIG. 6 shows a schematic drawing of the balance shaft sprocket 3 moved counterclockwise (in the direction of the arrow) relative to the crankshaft sprocket 2 and the compression of two opposing springs 6a and the extension of the other two opposing springs 6b. FIG. 7 illustrates the clockwise movement (in the direction of the arrow) of the balance shaft sprocket 3 relative to the crankshaft sprocket 2. These springs absorb the crankshaft torsional vibrations, which are further damped by the damping mechanism 7, 8, 9, and 12 and prevent their transfer to other parts of the engine system.

FIG. 8 shows an exploded view of how the two sprockets 2, 3 fit together. The orientation of the resilient members 6 and the damper springs 8 are shown as well as the location of the blocks 9 at an outer end on the damper springs 8. The extending portion 4 of the balance shaft drive sprocket 3 is located on a face of the sprocket 3 adjacent the crankshaft sprocket 2.

Figure 11:
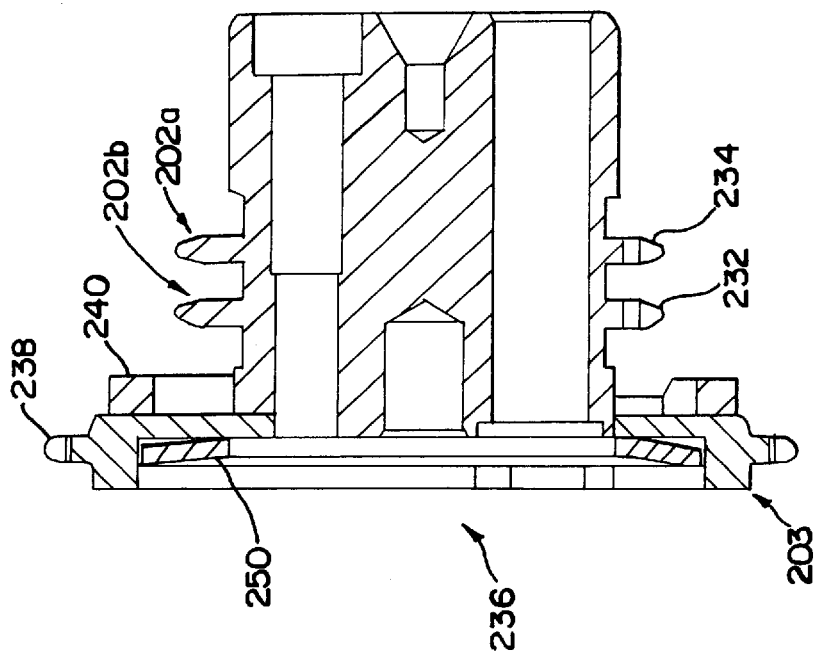
FIG. 11 is a sectional view taken along line 11—11 in FIG. 10, illustrating the torsionally compliant sprocket assembly with the belleville washer damper element.
Figure 10:
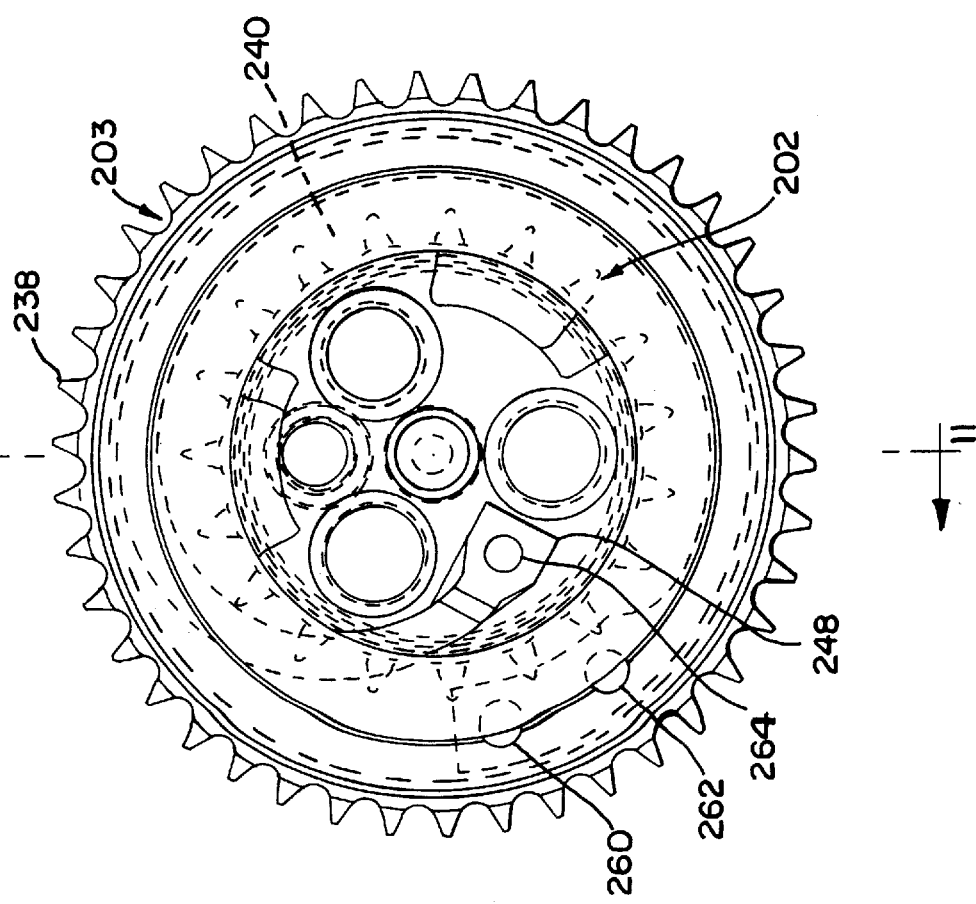
FIG. 10 is a plan view of the embodiment shown in FIG. 9 illustrating the sprocket assembly.

FIGS. 9, 10 and 11 illustrate a second embodiment of the torsionally compliant sprocket system, with crankshaft drive sprockets 202a and 202b. Sprockets 202a and 202b correspond to sprocket pair 104 illustrated in FIG. 1. Crankshaft drive sprocket 203 drives the balance shafts. Sprocket 203 corresponds to sprocket 102 in FIG. 1. The sprockets are shown schematically in FIG. 9, without the individual sprocket teeth.

The crankshaft sprockets 202a and 202b may be conventional involute tooth sprockets. The driving crankshaft sprockets are mounted on a hub 230. The sprockets 202a, 202b are mounted on the hub 230 by any suitable fastening means such as weldment, splines or keyways. A pair of chains are disposed on teeth 232, 234 of the sprockets 202a, 202b which connects the crankshaft to the camshafts. The size and dimensions of the driving sprocket are dependent upon the engine and configuration of the system.

The torsionally compliant sprocket assembly further includes a balance shaft drive sprocket 203 which is also mounted on the hub 230. The balance shaft drive sprocket 203 can also be any conventional sprocket with dimensions dependent upon the system configuration and power requirements. This sprocket is also mounted on the hub 230 and includes a central opening 236 to permit connection of the hub and sprocket assembly to the crankshaft. The balance shaft sprocket 203 is mounted on the hub 230 by any suitable fastening means such as weldment, splines or keyways. A chain is disposed about the teeth 238 of the sprocket 203 and drivingly connects the sprockets on the balance shafts.

The planar torsion spring 240, shown in FIG. 9, is sized to fit between the balance shaft sprocket 203 and hub 230. The planar torsion spring is adapted to move independently of the two sprockets. The planar torsional spring serves to absorb the vibrations and the torsional forces from the crankshaft.

The planar torsion spring 240 can be mounted around the crankshaft in any manner provided that it is located between the sprocket and the hub. Preferably, the planar torsion spring is wrapped in a circular fashion around the crankshaft in a spiral shape. A first end 242 of the planar torsion spring 240 is attached to the balance shaft sprocket by any known means, but is fitted, in one example, into the slot 244 formed in the side of the sprocket. The second end 246 of the planar torsion spring 240, is fitted into a slot 248 formed in the hub 230, as shown in FIG. 9.

Another example of attaching the spring 240 (shown in broken lines) is shown in FIG. 10, where one end of the spring 240 is attached to the side of the sprocket 203 by a pair of rivets 260, 262. The other end of the spring 240 is fixed in the slot 248 formed in the hub by a single rivet 264. Riveting the ends of the spring prevents the spring from vibrating loosely in the slots, which reduces noise, and further, improves the function of the spring.

In operation of the torsionally compliant sprocket assembly, the planar torsion spring absorbs torsional oscillations from the crankshaft during rotation of the crankshaft. Without the spring 240, vibrations in the crankshaft will be transmitted from the crankshaft through the hub and sprockets and then to the chains, balance shafts and their components. The torsional spring will deform and permit some relative rotation between the balance shaft sprocket 203 and the hub 230. Thus, the sprocket 203 must be mounted on the hub in such a way to permit some relative rotation.

FIG. 11 shown the damping member or belleville washer 250 disposed in the central opening 236. The assembly containing the hub 230, sprockets 202, 203, planar spring 240 and belleville washer 250 is connected to the crankshaft as a unit. The crankshaft connects to the assembly by the central opening causing the belleville washer to bear upon the crankshaft on one side and the camshaft drive sprocket 203 on the other side. In operation the damping member 250 frictionally damps movement between the sprocket 203 and the crankshaft.

Although specific embodiments and examples have been disclosed herein, it should be borne in mind that these have been provided by way of explanation and illustration and the present invention is not limited thereby. Certainly modifications which are within the ordinary skill in the art are considered to lie within the scope of this invention as defined by the following claims.

What is claimed is:

1. A torsionally compliant sprocket system for an engine comprising:
    a crankshaft having an attached crankshaft drive sprocket,
    a balance shaft drive sprocket mounted on said crankshaft in side-by-side relation to said crankshaft drive sprocket;
    a camshaft having a driven camshaft sprocket mounted thereon, said camshaft sprocket being aligned with said crankshaft drive sprocket;
    a balance shaft having a driven balance shaft sprocket mounted thereon, said balance shaft sprocket being aligned with said balance shaft drive sprocket;
    a first chain extending between and drivingly engaging said crankshaft drive sprocket and said camshaft sprocket;
    a second chain extending between and drivingly engaging said balance shaft drive sprocket and said balance shaft sprocket;
    a resilient member resiliently coupling said balance drive shaft sprocket and said crankshaft drive sprocket;
    at least one damping member acting on said balance shaft drive sprocket to damp vibration from said crankshaft.

2. A torsionally compliant sprocket system as in claim 1, wherein said resilient member is a planar torsion spring.

3. A torsionally compliant sprocket system as in claim 1, wherein said damping member is a belleville spring interposed between said crankshaft and said balance shaft sprocket.

4. A torsionally compliant sprocket system for an engine as in claim 1 wherein:
    said balance drive shaft sprocket has an extending member; said crankshaft drive sprocket has a complementary receiving portion for accommodating and receiving said extending member of said balance shaft drive sprocket; said receiving portion of said balance shaft drive sprocket and said extending member of said crankshaft drive sprocket having said resilient member therebetween.

5. A torsionally compliant sprocket system as in claim 4, wherein said extending member of said balance shaft drive sprocket extends axially into said receiving portion of said crankshaft of said crankshaft drive sprocket.

6. A torsionally compliant sprocket system as in claim 5, wherein said receiving portion of said crankshaft drive sprocket includes a plurality of offset cut out portions.

7. A torsionally compliant sprocket system as in claim 6, wherein said axially extending member includes a plurality of radially extending offset cut out portions which complement the cut out portions of said receiving portion so that the extending member of the balance shaft drive sprocket fits matingly into the receiving portion of said crankshaft drive sprocket.

8. A torsionally compliant sprocket system as in claim 7, wherein said resilient member comprises a plurality of springs.

9. A torsionally compliant sprocket system as in claim 7, wherein said resilient member comprises a plurality of elastomeric members.

10. A torsionally compliant sprocket system as in claim 7, wherein said damping mechanism includes:

- a pair of damper spring housings having an inner wall and an outer opening formed in said extending member of said balance shaft sprocket, said outer opening open to an outer periphery of said extending member;
- a damper spring disposed in each of said damper spring housings, each said damper spring having a first and a second end, said first end positioned against said inner wall of said housing, said second end located adjacent said outer opening of said housing;
- a friction block disposed at each said second end of said damper springs,
- a friction surface formed on an inner surface of said receiving portion of said crankshaft sprocket, said inner surface adjacent said outer periphery of said axially extending member;
- each said damper springs biasing said friction blocks in a protruding direction from said damper spring housings against said friction surface to provide damping friction therebetween.

11. A torsionally compliant sprocket system as in claim 8, wherein said resilient member comprises four sets of diametrically opposed springs placed between the cut out portions of the axially extending member of said balance shaft drive sprocket and said cut out portions of said receiving portion of said crankshaft drive sprocket.

12. A torsionally compliant sprocket system as in claim 11, wherein relative rotational movement of said crankshaft drive sprocket and said balance shaft drive sprocket in a first direction causes compression of two of said sets of springs, relative movement of said crankshaft drive sprocket and said balance shaft drive sprocket in a reverse direction causes compression of the other two of said sets of springs.

13. A torsionally compliant sprocket system as in claim 11 wherein said cut out portions of said axially extending member and said cut out portions of said receiving portion include a series of stepped ledges for containing said spring sets.

14. A torsionally compliant sprocket system as in claim 13 wherein a plurality of position stops are formed on said inside surface of said receiving portion; said position stops contacting corresponding surfaces of said cut out portions of said extending member when said balance shaft drive rotates a predetermined amount relative to said crankshaft drive sprocket and stopping relative motion therebetween.

15. A torsionally compliant sprocket system comprising:

- a first sprocket positioned along a rotating shaft, said first sprocket having a first set of recessed cut out portions;
- a second sprocket positioned along said rotating shaft adjacent said first sprocket, said second sprocket having an extending member with a second set of cut out portions which matingly fit into said recessed cut out portion of said first sprocket, a plurality of springs interposed between said first set of cut out portions and said second set of cut out portions, limited relative rotational movement of said sprockets and compression of at least two of said spring sets being effective to absorb torsional vibrations transmitted from said rotating shaft to said sprockets.

* * * * *